US009889807B2

(12) United States Patent
Siegel et al.

(10) Patent No.: US 9,889,807 B2
(45) Date of Patent: *Feb. 13, 2018

(54) VEHICLE AND SYSTEM FOR SUPPLYING ELECTRICAL POWER TO A VEHICLE ELECTRICAL LOAD

(71) Applicant: Rolls-Royce North American Technologies, Inc., Indianapolis, IN (US)

(72) Inventors: William L. Siegel, Mercersburg, PA (US); Rigoberto J. Rodriguez, Avon, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/286,149

(22) Filed: Oct. 5, 2016

(65) Prior Publication Data

US 2017/0021783 A1 Jan. 26, 2017

Related U.S. Application Data

(63) Continuation of application No. 14/859,477, filed on Sep. 21, 2015, now Pat. No. 9,487,303, which is a
(Continued)

(51) Int. Cl.
*B64D 41/00* (2006.01)
*B60R 16/03* (2006.01)
(Continued)

(52) U.S. Cl.
CPC ............. *B60R 16/03* (2013.01); *B60L 11/02* (2013.01); *B60R 16/0215* (2013.01);
(Continued)

(58) Field of Classification Search
CPC ........ B64D 41/00; B64D 27/00; B64D 33/00; B64D 2221/00; B64D 2013/0614;
(Continued)

(56) References Cited

U.S. PATENT DOCUMENTS 2,840,729 A * 6/1958 Kreuthmeir ............. H02N 1/08
310/309
2,843,767 A * 7/1958 Whitlock ................ H02N 1/08
310/309
(Continued)

FOREIGN PATENT DOCUMENTS

WO WO-2008/061712 A1 5/2008

OTHER PUBLICATIONS

International Search Report dated Mar. 13, 2014 for PCT/US2013/071694.

*Primary Examiner* — Medhat Badawi
(74) *Attorney, Agent, or Firm* — Fishman Stewart PLLC

(57) ABSTRACT

A system of a vehicle may include an electrical load, a generator, and first and second conduits. The electrical load of the vehicle may include a high energy device that utilizes above 270 volts during operations of the vehicle. The generator may be coupled to an engine of the vehicle and configured to generate electrical power at a voltage above 270 volts for the electrical load of the high energy device during operations of the vehicle. The first and second conduits may be arranged along each other to house respective first and second conductors that are electrically disposed between the electrical load and the generator.

20 Claims, 2 Drawing Sheets

Related U.S. Application Data continuation of application No. 14/132,616, filed on Dec. 18, 2013, now Pat. No. 9,193,311.

(60) Provisional application No. 61/774,966, filed on Mar. 8, 2013.

(51) Int. Cl.

| | | |
|---|---|---|
| B60R 16/02 | (2006.01) | |
| H01B 9/06 | (2006.01) | |
| H01B 7/42 | (2006.01) | |
| H02J 4/00 | (2006.01) | |
| B64D 33/00 | (2006.01) | |
| B60L 11/02 | (2006.01) | |
| B64D 13/06 | (2006.01) | |

(52) U.S. Cl.
CPC ............ *B64D 33/00* (2013.01); *B64D 41/00* (2013.01); *H01B 7/423* (2013.01); *H01B 9/0605* (2013.01); *H02J 4/00* (2013.01); *B60L 2200/10* (2013.01); *B64D 2013/0614* (2013.01); *B64D 2221/00* (2013.01); *Y02T 50/44* (2013.01)

(58) Field of Classification Search
CPC ...... H01B 7/423; H01B 9/0605; H01B 12/02; H01B 12/16; H02J 4/00; H01L 39/16; H02H 7/001; H02N 1/08; B60R 16/0215; B60R 16/03; Y02T 50/44; Y02T 50/62; F02C 7/32; F02C 7/36

See application file for complete search history.

(56) References Cited

U.S. PATENT DOCUMENTS

| | | | | |
|---|---|---|---|---|
| 2,862,146 A * | 11/1958 | Kreuthmeir | ............... | H02N 1/08 123/630 |
| 3,013,108 A * | 12/1961 | Sweeney | ................... | H01B 7/04 174/111 |
| 3,387,648 A * | 6/1968 | Ward, Jr. | ........... | H05K 7/20572 165/104.33 |
| 3,529,071 A * | 9/1970 | Kafka | ................... | H01B 12/14 174/110 PM |
| 3,726,985 A * | 4/1973 | Aupoix | .................. | H01B 12/14 174/113 R |
| 3,749,811 A * | 7/1973 | Bogner | .................. | H01B 12/06 174/126.2 |
| 3,780,205 A * | 12/1973 | Aupoix | ...................... | F16L 9/18 174/15.4 |
| 4,692,569 A * | 9/1987 | Winner | ...................... | B64F 1/34 191/12 R |
| 4,891,600 A * | 1/1990 | Cox | ........................ | F03H 99/00 250/251 |
| 5,159,154 A * | 10/1992 | Hillis | ........................ | H01B 7/08 174/9 R |
| 5,266,155 A * | 11/1993 | Gray | .................. | H01J 1/3042 216/100 |
| 5,281,905 A * | 1/1994 | Dhyanchand | ........... | F02N 11/04 290/38 R |
| 5,491,979 A * | 2/1996 | Kull | ................... | B64D 11/0007 165/104.28 |
| 5,497,332 A * | 3/1996 | Allen | .................. | G01R 19/25 700/295 |
| 5,513,093 A * | 4/1996 | Corrigall | ............. | B23K 9/1006 219/130.1 |
| 5,513,500 A * | 5/1996 | Fischer | ............. | B64D 11/0007 62/239 |
| 5,864,221 A * | 1/1999 | Downs | .................. | H02J 9/061 320/134 |
| 7,255,062 B1 * | 8/2007 | Higman | .................. | H05H 1/46 118/723 AN |
| 7,285,871 B2 * | 10/2007 | Derouineau | ............. | F02C 9/26 290/52 |
| 7,433,190 B2 * | 10/2008 | Kehl | .................. | H05K 7/20636 165/80.4 |
| 7,508,086 B2 * | 3/2009 | Huang | .................... | F02N 11/04 290/31 |
| 7,525,041 B2 * | 4/2009 | Howard | ............... | H02G 3/0412 174/28 |
| 7,813,147 B2 * | 10/2010 | Blanchery | ............... | H01F 30/02 323/255 |
| 8,238,130 B2 * | 8/2012 | Wiegman | .............. | B60L 11/1868 363/131 |
| 8,536,811 B2 * | 9/2013 | Wrobel | .................... | H02P 1/28 318/400.11 |
| 2004/0221604 A1 * | 11/2004 | Ota | .................... | H05K 7/20781 62/259.2 |
| 2005/0056440 A1 | 3/2005 | Feuerstein et al. | | |
| 2005/0068014 A1 * | 3/2005 | Dillon | ....................... | G05F 1/40 323/268 |
| 2005/0210910 A1 * | 9/2005 | Rigney | .............. | B60H 1/00014 62/407 |
| 2006/0044722 A1 * | 3/2006 | Wavering | ............... | B64D 41/00 361/62 |
| 2006/0291512 A1 * | 12/2006 | Borschowa | ........... | H01S 5/0683 372/38.02 |
| 2007/0137210 A1 | 6/2007 | Costello et al. | | |
| 2007/0152796 A1 * | 7/2007 | He | ....................... | H01F 17/0006 336/223 |
| 2007/0253135 A1 * | 11/2007 | Bovitz | .................... | H02M 1/10 361/118 |
| 2008/0148747 A1 * | 6/2008 | Solntsev | ................ | B64D 13/00 62/120 |
| 2008/0190637 A1 * | 8/2008 | Folts | ...................... | H01B 12/02 174/15.6 |
| 2008/0190646 A1 * | 8/2008 | Folts | ...................... | H01B 12/02 174/125.1 |
| 2008/0192392 A1 * | 8/2008 | Folts | ...................... | H01B 12/02 361/19 |
| 2008/0194411 A1 * | 8/2008 | Folts | ...................... | H01L 39/16 505/110 |
| 2010/0019776 A1 * | 1/2010 | Folts | .................. | G01R 33/1246 324/539 |
| 2010/0038969 A1 * | 2/2010 | Hu | .......................... | H02P 9/102 307/84 |
| 2010/0044016 A1 * | 2/2010 | Frey | ...................... | B64D 13/06 165/104.33 |
| 2010/0087322 A1 * | 4/2010 | Yuan | ..................... | H01B 12/16 505/163 |
| 2010/0193630 A1 * | 8/2010 | Duces | ........................ | H02J 3/02 244/58 |
| 2010/0243288 A1 * | 9/2010 | Eriksson | ................ | H01B 17/54 174/15.3 |
| 2010/0279874 A1 * | 11/2010 | Soika | ...................... | H01B 12/02 505/163 |
| 2010/0327111 A1 * | 12/2010 | Sanderson | ................ | B64C 9/22 244/99.3 |
| 2011/0036998 A1 * | 2/2011 | Bradley | .................. | F41G 7/224 250/492.1 |
| 2011/0275698 A1 * | 11/2011 | Skomedal | .......... | A61K 31/7105 514/44 A |
| 2012/0049633 A1 * | 3/2012 | Leadingham | ........... | B64F 1/364 307/80 |
| 2012/0092284 A1 * | 4/2012 | Rofougaran | ........... | G06F 3/017 345/173 |
| 2012/0101658 A1 * | 4/2012 | Bradley | .................. | F41G 7/224 701/2 |
| 2012/0151950 A1 * | 6/2012 | Jagusztyn | ............. | F28D 7/1684 62/228.1 |
| 2013/0221292 A1 * | 8/2013 | Ingold | ...................... | H01B 3/56 252/571 |
| 2013/0265692 A1 * | 10/2013 | Mahdizadeh | ........... | H01B 3/56 361/601 |
| 2013/0266154 A1 * | 10/2013 | McCormack | ........... | H04R 3/00 381/117 |
| 2013/0310994 A1 * | 11/2013 | Schroeter | ............... | B64D 41/00 700/287 |

(56) References Cited

U.S. PATENT DOCUMENTS

| | | | |
|---|---|---|---|
| 2014/0103650 A1* | 4/2014 | Nguyen | F02N 11/087 290/31 |
| 2014/0132062 A1* | 5/2014 | Brombach | B64F 1/34 307/9.1 |
| 2015/0001338 A1* | 1/2015 | Siegel | H02J 4/00 244/58 |
| 2015/0041598 A1* | 2/2015 | Nugent | H02J 17/00 244/53 R |

* cited by examiner

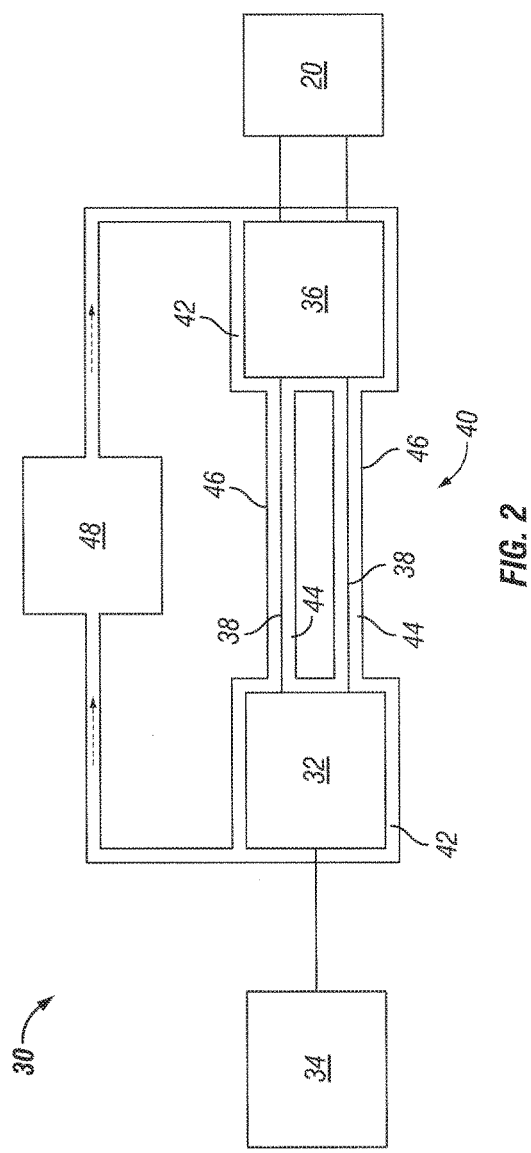
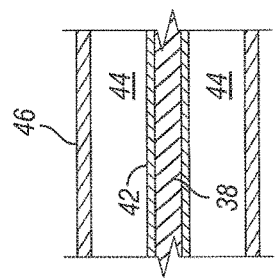

VEHICLE AND SYSTEM FOR SUPPLYING ELECTRICAL POWER TO A VEHICLE ELECTRICAL LOAD

CROSS-REFERENCE TO RELATED APPLICATIONS

This application is a continuation of U.S. patent application Ser. No. 14/859,477 filed Sep. 21, 2015 which is a continuation of U.S. patent application Ser. No. 14/132,616 filed Dec. 18, 2013 now U.S. Pat. No. 9,193,311 issued Nov. 24, 2015 which claims priority to U.S. Provisional Patent Application No. 61/774,966 filed Mar. 8, 2013, the contents of all of which are hereby incorporated by reference in their entirety.

FIELD OF THE DISCLOSURE

The present disclosure relates to aircraft, and more particularly, to aircraft and systems for supplying electrical power to an aircraft electrical load.

BACKGROUND

Aircraft and systems for supplying electrical power to aircraft electrical loads remain an area of interest. Some existing systems have various shortcomings, drawbacks, and disadvantages relative to certain applications. Accordingly, there remains a need for further contributions in this area of technology.

One embodiment of the present disclosure is a unique aircraft. Another embodiment is a unique system for supplying electrical power to an aircraft electrical load during flight operations. Other embodiments include apparatuses, systems, devices, hardware, methods, and combinations for fluid driven actuation systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 2 schematically illustrates some aspects of a non-limiting example of a system for supplying electrical power to an aircraft electrical load during flight operations of an aircraft in accordance with an embodiment of the present disclosure.

FIG. 3 schematically illustrates a sectional view of some aspects of a non-limiting example of a conduit and a conductor in accordance with an embodiment of the present disclosure.

DETAILED DESCRIPTION

Figure 1:
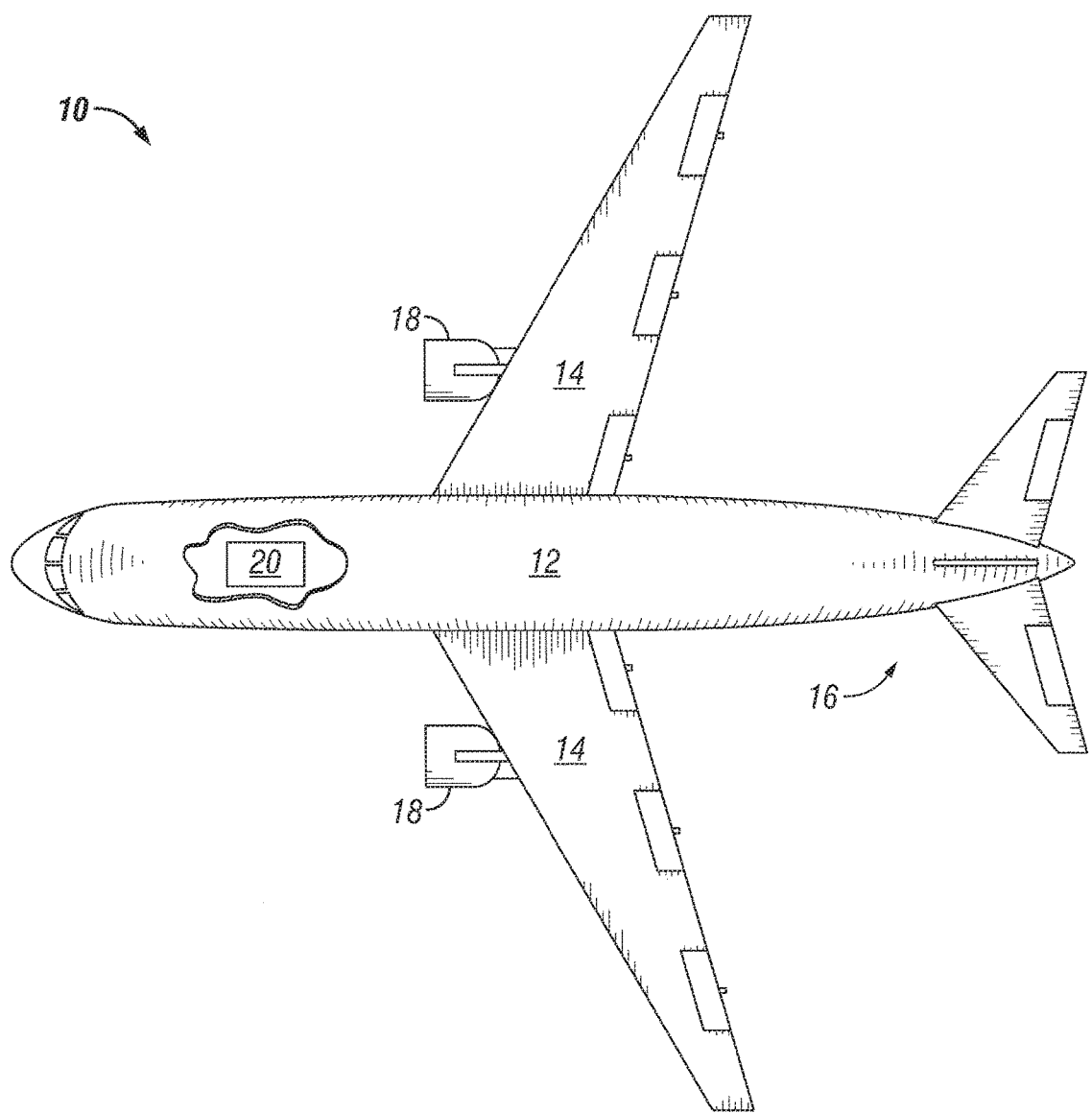
FIG. 1 illustrates some aspects of a non-limiting example of an aircraft in accordance with an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to FIG. 1, there are illustrated some aspects of a non-limiting example of a vehicle 10 in accordance with an embodiment of the present disclosure. In one form, vehicle 10 is an aircraft, referred to herein as aircraft 10. In one form, aircraft 10 includes a fuselage 12, wings 14, an empennage 16, propulsion engines 18 and an aircraft electrical load 20. Wings 14 and empennage 16 are coupled to fuselage 12. In one form, aircraft 10 is a twin engine aircraft. In one form, engines 18 are turbofan engines. In other embodiments, engines 18 may be turboprop engines, turboshaft engines, turbojet engines, hybrid engines, or any other type of engine. In one form, engines 18 are coupled to wings 14. In other embodiments, engines 18 may be coupled to any one or more aircraft 10 structures, e.g., including fuselage 12 and/or empennage 16.

In one form, aircraft 10 is a fixed-wing aircraft. In other embodiments, aircraft 10 may be any type of aircraft, e.g., including and without limitation, a rotary-wing aircraft, a combination rotary-wing/fixed-wing aircraft, a tilt-rotor aircraft, and/or a tilt-wing aircraft, and may be manned or autonomous. In various embodiments, aircraft 10 may have a single main propulsion engine or a plurality of main propulsion engines. In addition, in various embodiments, aircraft 10 may employ any number of wings 14. Empennage 16 may employ a single or multiple flight control surfaces.

Electrical load 20 is associated with aircraft 10 during flight operations. In one form, electrical load 20 includes one or more high energy devices, such as directed energy weapon systems, e.g., a high power laser system, a high power microwave system and/or a high power millimeter wave system. In other embodiments, electrical load 20 may be any electrical load associated with aircraft 10, e.g., including flight computer systems, navigation and communication systems, radar systems and other hazard detection/avoidance systems, flight control surface positioning systems, landing gear systems, cabin environmental control systems, or any electrical system employed by aircraft 10 during flight operations.

Referring to FIGS. 2 and 3, some aspects of a non-limiting example of a system 30 for supplying power to electrical load 20 during flight operations of aircraft 10 in accordance with an embodiment of the present disclosure are schematically illustrated. Conventional aircraft electrical systems deliver power from the generator at 270V or less. For larger power systems, e.g., 500 kW and above, the cable (conductor) sizes required to carry the power at 270V become undesirably larger and heavier relative to smaller power systems. Hence, it is desirable to operate some parts of the power system at higher voltages. However, the transmission of electric power on aircraft is typically limited to approximately 270V due to breakdown of known electrical cable insulation. Voltages above 270V may result in corona effects, e.g., electrical discharge through the sheath or cable insulation, in some ambient conditions, e.g., lower altitudes. System 30 is configured to supply electrical power at voltages greater than 270V.

System 30 includes a generator 32 driven by an engine 34; a voltage reducer 36; a plurality of conductors 38; and a conduit system 40. System 30 is configured to generate electrical power for electrical load 20 during flight operations of aircraft 10.

Generator 32 is mechanically coupled to engine 34. Generator 32 is configured to generate electrical power for electrical load 20. In one form, generator 32 is a synchronous generator. In other embodiments, generator 32 may be any electrical power generating machine configured to convert mechanical power into electrical power in AC and/or DC form.

Engine 34 is coupled to generator 32, and is configured to supply mechanical power to generator 32 for conversion by generator 32 to electrical power. In one form, engine 34 is one or more propulsion engines for aircraft 10, e.g., one or more engines 18. In other embodiments, engine 34 may be any engine installed in or on aircraft 10. In one form, engine 34 is a gas turbine engine. In other embodiments, engine 34 may be any other type of engine.

Voltage reducer 36 is electrically coupled between conductors 38 and electrical load 20. Voltage reducer 36 is configured to reduce the voltage of the electrical power output of generator 32 to a voltage level suitable for use by electrical load 20. In one form, voltage reducer 36 is a transformer. In other embodiments, voltage reducer 36 may be another type of voltage reducer, e.g., a voltage divider. In still other embodiments, voltage reducer 36 may take one or more other forms in addition to or in place of a transformer and/or a voltage divider. Yet other embodiments may not include a voltage reducer such as voltage reducer 36.

Conductors 38 are electrically disposed between generator 32 and voltage reducer 36. Conductors 38 are configured to conduct electrical power between generator 32 and electrical load 20. In one form, conductors 38 are configured to conduct electrical power between generator 32 and electrical load 20 via voltage reducer 36. In other embodiments, conductors 38 may be directly coupled to electrical load 20. In some instances, voltage reducer 36 may be positioned some distance from generator 32, e.g., adjacent to electrical load 20, and hence, the length of conductors 38 may vary with the needs of the application.

In one form, conductors 38 are copper conductors. In other embodiments, conductors 38 may be formed of other materials in addition to or in place of copper. In one form, each conductor 38 includes an insulator 42, e.g., one or more layers of conventional wire insulation configured for aircraft service. In other embodiments, other types of insulators may be employed, or none may be employed. In one form, two conductors 38 are employed as input and output conductors. The number of conductors 38 may vary with the needs of the particular application. Other embodiments may employ more than two or less than two conductors.

Conduit system 40 includes a dielectric gas 44 disposed within conduits 46. Conduits 46 are configured to house conductors 38. In addition, conduits 46 are configured to envelope conductors 38 in one or more layers of dielectric gas 44 in order to insulate conductors 38 with dielectric gas 44. By enveloping conductors 38 in one or more layers of a dielectric gas 44, system 30 allows the transmission of electrical power at higher voltages in or on aircraft 10 via conductors 38 than may be transmitted otherwise, e.g., via conventional insulation alone. By using a higher voltage, the size and weight of conductors 38 may be reduced relative to conductors that operate at lower voltages. In various embodiments, all or portions of generator 32 and/or voltage reducer 36 may be enveloped in dielectric gas 44. In one form, conduit system 40 includes one conduit 46 per conductor 38. In other embodiments, more than one conductor may be disposed in each conduit 46. In still other embodiments, multiple conduits 46 may be employed per conductor 38, e.g., arranged coaxially as one potential means for enveloping conductors 38 in more than one layer of dielectric gas 44. In other embodiments, multiple layers of dielectric gas 44 may be achieved, for example and without limitation, by coaxially disposing one or more tubes (not shown) around conductor 38, within conduit 46, wherein each tube is spaced apart radially from an adjacent tube, conductor 38 or conduit 46 to form coaxial layers of dielectric gas surrounding conductor 38. Standoffs (not shown) may be employed to maintain radial spacing between the tubes, conductor 38 and conduit 46. The standoffs and tubes may be formed of non-conducting materials. In various embodiments, conduits 46 are sealed to prevent leakage of dielectric gas 44.

In one form, a cooling system 48 is employed to cool conductors 38. In particular, cooling system 48 is configured to distribute dielectric gas through conduits 46 to cool conductors 38. In one form, cooling system 48 is also configured to cool part or all of one or both of generator 32 and voltage reducer 36 by distributing dielectric gas therethrough. In one form, cooling system 48 is a refrigeration system, e.g., a vapor compression refrigeration system, wherein dielectric gas 44 is a refrigerant vapor, and wherein conduits 46 form return lines in the refrigeration system. In other embodiments, cooling system 48 and dielectric gas 44 may take other forms, for example, a heat exchange system that circulates dielectric gas 44 in the form of a refrigerant vapor or another gas or vapor. Still other embodiments may not employ a cooling system to circulate dielectric gas 44.

Embodiments of the present disclosure include an aircraft, comprising: a wing; a fuselage coupled to the wing; an engine coupled to at least one of the fuselage and the wing; an electrical load associated with the aircraft during flight operations; a generator coupled to the engine and configured to generate electrical power for the electrical load; a conductor electrically disposed between the electrical load and the generator; a conduit configured to house the conductor; and a dielectric gas disposed in the conduit; wherein the conduit is configured to envelop the conductor in the dielectric gas.

In a refinement, the generator is at least partially enveloped within in the dielectric gas.

In another refinement, the dielectric gas is a refrigerant vapor.

In yet another refinement, the aircraft further comprises a refrigeration system and a refrigerant configured for use with the refrigeration system, wherein the dielectric gas is a refrigerant vapor.

In still another refinement, the refrigeration system is configured to cool the generator.

In yet still another refinement, the generator is at least partially enveloped within the refrigerant vapor In a further refinement, the aircraft further comprises a voltage reducer electrically coupled between the conductor and the electrical load, wherein the voltage reducer is enveloped within the refrigerant vapor; and wherein the refrigeration system is configured to cool the voltage reducer.

In a yet further refinement, the refrigeration system is configured to cool the conductor.

In a still further refinement, the aircraft further comprises a voltage reducer electrically coupled between the conductor and the electrical load, wherein the voltage reducer is enveloped within the dielectric gas.

In a yet still further refinement, the voltage reducer is a transformer.

In another further refinement, the voltage reducer is a voltage divider.

In yet another further refinement, the generator is at least partially enveloped within the dielectric gas.

In still another further refinement, the conduit is configured to envelop the conductor in at least one layer of dielectric gas.

Embodiments of the present disclosure include a system for supplying power to an aircraft electrical load during flight operations of an aircraft, comprising: an engine mounted in or on the aircraft; a generator coupled to the engine and configured to generate electrical power for the aircraft electrical load during flight operations of the aircraft; a conductor electrically disposed between the aircraft electrical load and the generator; a conduit configured to house the conductor; and a dielectric gas disposed in the conduit; wherein the conduit is configured to at least partially envelop the conductor in at least one layer the dielectric gas.

In a refinement, the system further comprises a voltage reducer electrically coupled between the conductor and the aircraft electrical load, wherein the voltage reducer is at least partially enveloped within the dielectric gas.

In another refinement, the system further comprises a refrigeration system and a refrigerant, wherein the dielectric gas is a refrigerant vapor; and wherein the refrigeration system is configured to cool the generator and/or the conductor and/or the voltage reducer using the refrigerant vapor.

In yet another refinement, the generator is at least partially enveloped within in the dielectric gas.

In still another refinement, the system further comprises a refrigeration system and a refrigerant, wherein the dielectric gas is a refrigerant vapor; and wherein the refrigeration system is configured to cool the generator and/or the conductor using the refrigerant vapor.

Embodiments of the present disclosure include an aircraft, comprising: an aircraft structure; an engine coupled to the aircraft structure; an electrical load associated with the aircraft during flight operations; a generator coupled to the engine and configured to generate electrical power for the electrical load during flight operations; a conductor electrically disposed between the electrical load and the generator; and means for insulating the conductor with a dielectric gas.

In a refinement, the dielectric gas is a refrigerant vapor.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A system of a vehicle, the system comprising:
   an electrical load of the vehicle including a high energy device that utilizes above 270 volts during operations of the vehicle;
   a generator coupled to an engine of the vehicle and configured to generate electrical power at a voltage above 270 volts for the electrical load of the high energy device during operations of the vehicle; and
   first and second conduits arranged along each other to house respective first and second conductors that are electrically disposed between the electrical load and the generator.

2. The system of claim 1, further comprising a dielectric gas disposed in at least one of the first and second conduits.

3. The system of claim 1, wherein at least one of the first and second conduits includes multiple conduits coaxially arranged and configured to envelop at least one of the first and second conductors in coaxial layers of dielectric gas.

4. The system of claim 1, further comprising a dielectric gas enveloping the generator.

5. The system of claim 1, further comprising a dielectric gas including a refrigerant vapor.

6. The system of claim 1, wherein a high energy device includes a high power directed energy system that is above 270 volts and includes at least one of a high power laser system, a high power microwave system, and a high power millimeter wave system.

7. The system of claim 1, further comprising a voltage reducer electrically coupled between at least one of the first and second conductors and the electrical load of the high energy device and configured to reduce the voltage of the electrical power of the generator from above 270 volts to a voltage level at or below 270 volts.

8. A system of an aircraft, the system comprising:
   an electrical load of the aircraft including a high energy device that utilizes above 270 volts during operations of the aircraft; and
   a generator coupled to an engine of the aircraft and configured to generate electrical power at a voltage above 270 volts for the electrical load of the high energy device during operations of the aircraft.

9. The system of claim 8, further comprising first and second conduits arranged along each other to house respective first and second conductors that are electrically disposed between the electrical load and the generator.

10. The system of claim 9, further comprising a dielectric gas disposed in at least one of the first and second conduits.

11. The system of claim 9, wherein at least one of the first and second conduits includes multiple conduits coaxially arranged and configured to envelop at least one of the first and second conductors in coaxial layers of dielectric gas.

12. The system of claim 8, further comprising a dielectric gas enveloping the generator.

13. The system of claim 8, further comprising a dielectric gas including a refrigerant vapor.

14. The system of claim 8, wherein high energy device includes a high power directed energy system that is above 270 volts and includes at least one of a high power laser system, a high power microwave system, and a high power millimeter wave system.

15. The system of claim 8, further comprising a voltage reducer electrically coupled between at least one of the first and second conductors and the electrical load of the high energy device and configured to reduce the voltage of the electrical power of the generator from above 270 volts to a voltage level at or below 270 volts.

16. A method of utilizing above 270 volts during operations of a vehicle, the method comprising:
   utilizing, by an electrical load of the vehicle including a high energy device, above 270 volts during operations of the vehicle;
   generating, by a generator coupled to an engine of the vehicle, electrical power at a voltage above 270 volts for the electrical load of the high energy device during operations of the vehicle; and
   electrically connecting, by first and second conductors housed by respective first and second conduits that are arranged along each other, the electrical load and the generator.

17. The method of claim 16, wherein a dielectric gas is disposed in at least one of the first and second conduits.

18. The method of claim 16, wherein at least one of the first and second conduits includes multiple conduits coaxially arranged and configured to envelop at least one of the first and second conductors in coaxial layers of dielectric gas.

19. The method of claim 16, wherein the generator is enveloped in a dielectric gas.

20. The method of claim 17, wherein the dielectric gas includes a refrigerant vapor.

* * * * *